(No Model.)

A. S. BAXENDALE.
DYNAMO ELECTRIC MACHINE.

No. 494,836. Patented Apr. 4, 1893.

Witnesses.

Inventor
Arthur S. Baxendale.
By James L. Norris, Atty.

UNITED STATES PATENT OFFICE.

ARTHUR S. BAXENDALE, OF SELANGOR, ENGLAND.

DYNAMO-ELECTRIC MACHINE.

SPECIFICATION forming part of Letters Patent No. 494,836, dated April 4, 1893.

Application filed April 22, 1892. Serial No. 430,288. (No model.) Patented in England December 9, 1890, No. 20,102.

*To all whom it may concern:*

Be it known that I, ARTHUR SALISBURY BAXENDALE, a citizen of England, residing at Selangor, Straits Settlements, have invented a new and useful Dynamo-Electric Machine, (for which I have obtained a patent in Great Britain, dated December 9, 1890, No. 20,102,) of which the following is a specification.

My invention relates to a dynamo electric machine wherein the bobbins of insulated wire, instead of being arranged on a revolving armature, are attached to the ends of an oscillating lever and, being thus moved to and fro in magnetic fields, have electric currents induced in them.

Figure 1:
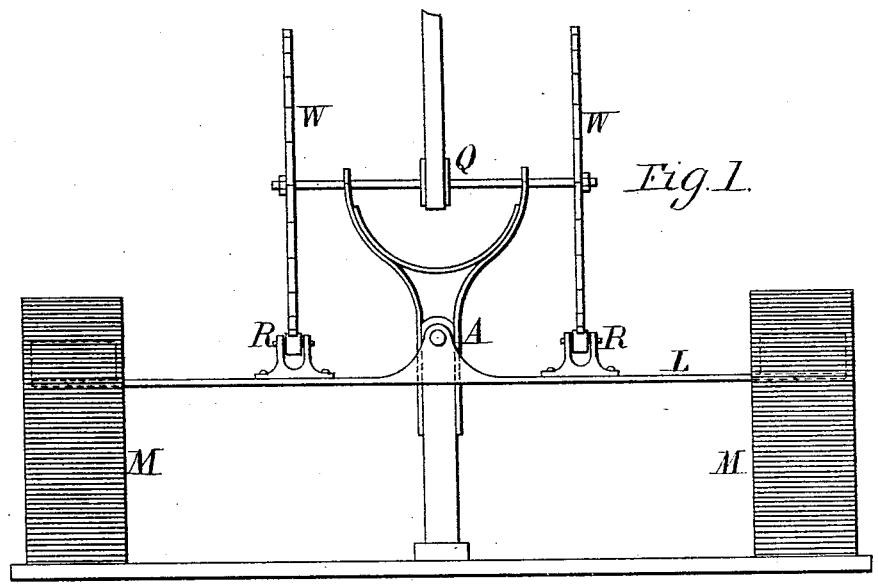
Figure 2:
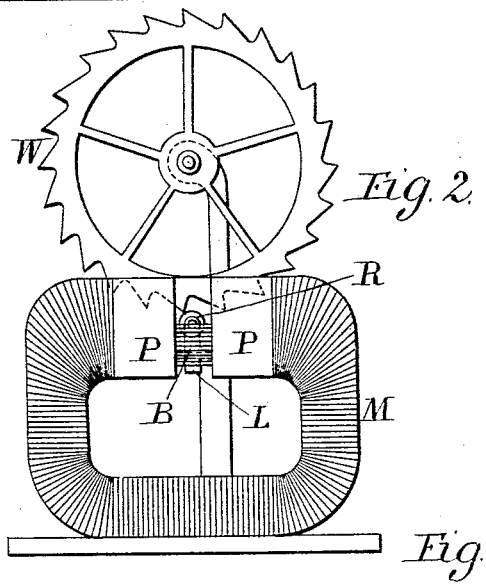
Figure 3:
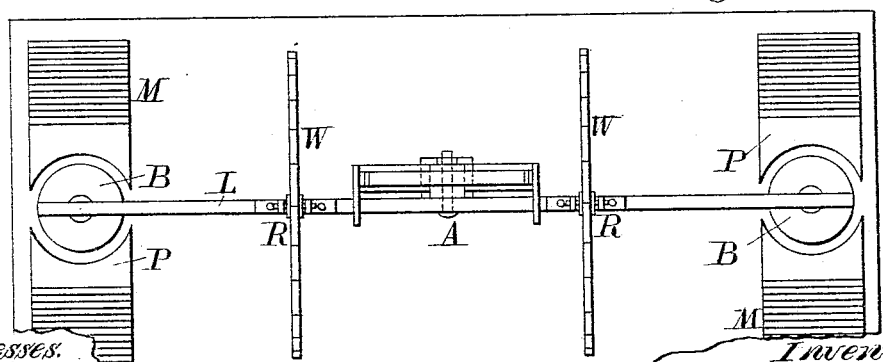

Figure 1 of the accompanying drawings is a front elevation. Fig. 2 is an end elevation and Fig. 3 is a plan of a dynamo electric machine according to my invention.

M M are two magnets which I have shown wound with wire so as to be electromagnets, but they might obviously be permanent magnets without such winding. They have pole pieces P hollowed out so as to allow bobbins B wound with insulated wire to reciprocate vertically in the spaces between the hollowed faces of the pole pieces. The bobbins B are fixed to opposite ends of a lever L which is pivoted at A and is caused to oscillate by the ratchet teeth of a pair of wheels W acting alternately on two antifriction rollers R mounted on the lever L. The wheels W are fixed on an axis carrying a pulley Q which is driven by a belt from any suitable motor.

Having thus described the nature of this invention and the best means I know of carrying the same into practical effect, I claim—

In a dynamo electric machine, the combination of a lever provided with anti friction rollers, a pair of magnets, a pair of bobbins wound with insulated wire and mounted at the ends of the lever in spaces between the pole pieces of the magnets, and a pair of continuously revolving wheels having ratchet teeth which alternately act on the anti-friction rollers of the lever, substantially as described.

In testimony whereof I have signed my name to this specification, in the presence of two subscribing witnesses, this 12th day of November, A. D. 1891.

ARTHUR S. BAXENDALE.

Witnesses:
    E. W. BIRCH,
*Magistrate, Malacca.*
    J. S. HEUGH,
*Royal Navy, Commanding H. M. S. Rattler.*